United States Patent [19]

Higashi et al.

[11] Patent Number: 5,692,015
[45] Date of Patent: Nov. 25, 1997

[54] COHERENT DETECTOR AND A COHERENT DETECTION METHOD FOR A DIGITAL COMMUNICATION RECEIVER

[75] Inventors: Akihiro Higashi, Yokosuka; Fumiyuki Adachi; Koji Ohno, both of Yokohama; Mamoru Sawahashi, Yokosuka, all of Japan

[73] Assignee: NTT Mobile Communications Network, Inc., Tokyo, Japan

[21] Appl. No.: 553,464

[22] PCT Filed: Jun. 21, 1995

[86] PCT No.: PCT/JP95/01229

§ 371 Date: Nov. 28, 1995

§ 102(e) Date: Nov. 28, 1995

[87] PCT Pub. No.: WO95/35615

PCT Pub. Date: Dec. 28, 1995

[30] Foreign Application Priority Data

Jun. 22, 1994 [JP] Japan .................... 6-140569

[51] Int. Cl.[6] ................... H03D 1/00; H04L 27/06
[52] U.S. Cl. .................... 375/340; 375/325; 375/349; 375/368; 370/514
[58] Field of Search ................. 375/200, 206, 375/205, 207, 325, 343, 367, 368, 369, 249, 340; 370/320, 335, 342, 503, 509, 512, 514, 515

[56] References Cited

U.S. PATENT DOCUMENTS

| 5,257,312 | 10/1993 | Therssen et al. | 381/4 |
| 5,329,547 | 7/1994 | Ling | 375/205 |
| 5,442,646 | 8/1995 | Chadwick et al. | 375/346 |
| 5,544,156 | 8/1996 | Teder et al. | 370/18 |

FOREIGN PATENT DOCUMENTS 7-46284  2/1995  Japan .

OTHER PUBLICATIONS

Higashi et al, "Performance of Coherent RAKE Detection Using Interpolation on DS/CDMA", IEICE Technical Research Report, vol. 94, No. 312, pp. 57–62, Oct. 28, 1994.

Sampei, Seiichi, "Rayleight Fading Compensation Method For Multi–level QAM For Land Mobile Communications", Seasonal Report of Communication Synthesis Institute, vol. 37, No. 1, pp. 87–98, Feb. 1991.

Sampei, Seiichi, "Rayleight Fading Compensation Method For 16–QAM Modem in Digital Land Mobile radio Systems", IEICE Transactions, vol. J72–B–II, No. 1, pp. 7–15, Jan. 1989.

*Primary Examiner*—Stephen Chin
*Assistant Examiner*—Don Vo
*Attorney, Agent, or Firm*—Rogers & Wells

[57] ABSTRACT

A coherent detection method including a step of estimating a transfer function of a propagation path using pseudo-pilot signals which consist of some information symbols adjacent to pilot signals. The information symbols in the pseudo-pilot signals are assumed to be known. The method includes the steps of estimating the transfer functions using the pilot signals, carrying out interpolation coherent detection of the information symbols using the estimated transfer functions, storing the detection results as the pseudo-pilot signals, reestimating the transfer functions associated with the information symbols corresponding to the pseudo-pilot signals by using the pseudo-pilot signals and the corresponding received signal under the assumption that the pseudo-pilot signals have a known correct pattern, and carrying out the interpolation coherent detection of the individual information symbols by using the transfer functions obtained by the reestimation. This makes it possible to estimate the transfer function at high accuracy with a small number of symbols per pilot signal, thereby improving the detection characteristics.

7 Claims, 7 Drawing Sheets

COHERENT DETECTOR AND A COHERENT DETECTION METHOD FOR A DIGITAL COMMUNICATION RECEIVER

TECHNICAL FIELD

The present invention relates to a coherent detector and a coherent detection method for demodulating a signal in a receiver employed in digital mobile communications or the like.

BACKGROUND ART

Various methods are employed for detecting digital signals in connection with modulation methods. Among these, a coherent detection method, which achieves detection using local oscillation in synchronism with a carrier frequency at a transmitting side, exhibits the best characteristics under Gaussian noise environment. In other words, the coherent detection method demands a minimum received-signal-power-to-noise ratio that fulfills a particular error rate. It is necessary, however, to fast estimate the transfer function of a propagation path at a receiving side to obtain the absolute phase of the transmission carrier required for the coherent detection. This is because the transfer function of the propagation path fluctuates sharply with time.

An interpolation coherent detection method is known as a method for carrying out the coherent detection by estimating the transfer function of the propagation path. For example, it is disclosed in Seiichi Sampei, "Fading Compensation for 16QAM in Land Communications", The Transactions of the Institute of Electronics, Information and Communication Engineers of Japan B-II, Vol. J72-B-II pp. 7–15, January 1989, or in its revised version, S. Sampei, et al. "Rayleigh Fading Compensation for QAM in Land Mobile Radio Communications", IEEE Transactions on Vehicular Technology, VOL. 42. No. 2, MAY 1993.

Figure 1:
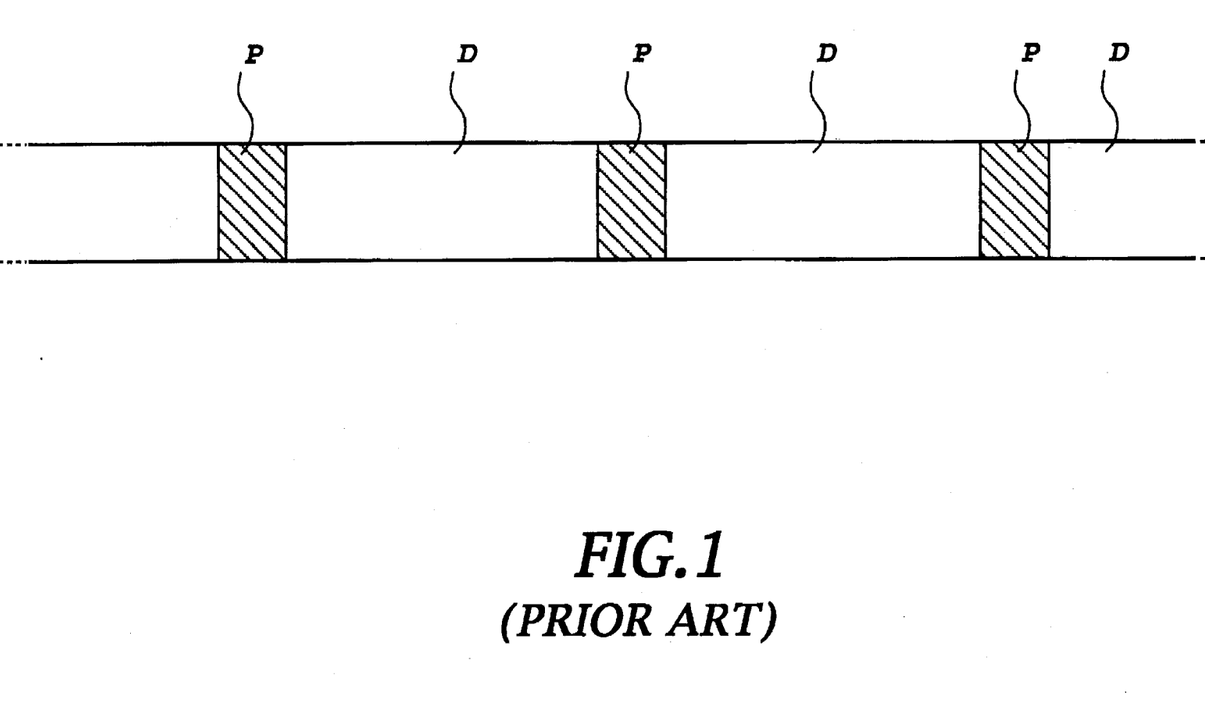
FIG. 1 is a diagram illustrating a format of a signal employed in interpolation coherent detection.

FIG. 1 illustrates a format of a signal used in such interpolation coherent detection. A transmitting side transmits a transmitted signal including a pilot signal P periodically inserted thereinto. The pilot signal has a pattern which is known both to transmitting and receiving sides, and contains one or more known symbols. One pilot signal P and an information symbol set (information signal) D sandwiched by successive two pilot signals P constitute one frame.

Figure 2:
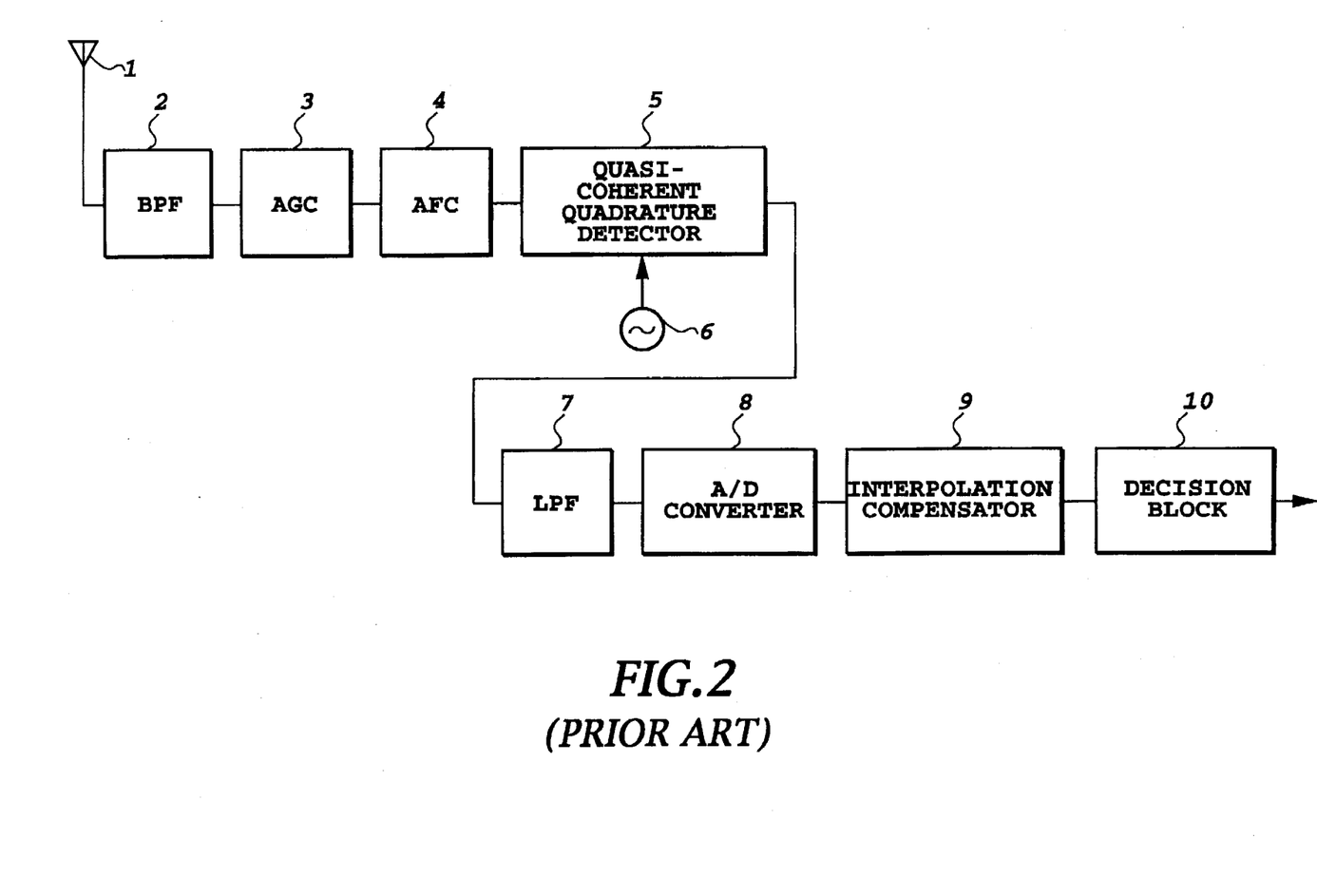
FIG. 2 is a block diagram showing a configuration of a conventional receiver up to a detection stage.

FIG. 2 shows a conventional receiver. Radio waves received by an antenna 1 are band-limited by a BPF (BandPass Filter) 2 to such an extent that an intended received signal suffer no distortion. The band-suppressed received signal is corrected to a normal level signal by an AGC (Automatic Gain Control) circuit 3, and the offset frequency between the carrier and a local oscillator is coarsely reduced by an AFC (Automatic Frequency Controller) 4. The BPF 2 is provided for ensuring the normal operation of the AGC 3 and the AFC 4.

Subsequently, the received signal undergoes quasi-coherent quadrature detection by a quasi-coherent quadrature detector 5 using a local signal from a local oscillator 6, which has the same frequency as the carrier of the received signal. The output of the quasi-coherent quadrature detector 5 is supplied to an interpolation compensator 9 through an LPF (LowPass Filter) 7 and an A/D converter 8. The LPF 7 is provided for suppressing noise from external bands and interference from adjacent channels. The interpolation compensator 9 estimates for each information symbol a transfer function by an interpolation method using the pilot signals, and compensates individual information symbols using the estimated transfer functions. The compensated signal undergoes decision by a decision block 10. Thus compensating each information symbol with the estimated transfer function enables the absolute phase detection. As a typical interpolation method, a first-order interpolation using two pilot signals, or a second-order interpolation using three pilot signals is generally used.

When the received signal includes noise, more accurate estimation of the transfer functions could be achieved by increasing the number of symbols per pilot signal, thereby reducing the estimation error of the transfer functions. Estimation of the transfer function associated with each information symbol can be carried out by applying the first-order or second-order Gaussian interpolation to the transfer functions estimated from the pilot signals.

In the conventional system described above, the transfer function associated with each information symbol can be estimated by a simple first-order interpolation when the fluctuations of the transfer functions of the propagation paths are much slower than the insertion period of the pilot signals. However, as the fluctuations of the transfer functions grow faster, the interpolation error increases, and hence, the insertion period of the pilot signal must be shortened. The shortening of the insertion period, however, increases the number of symbols of the pilot signals, and this will reduce the transmission efficiency. On the other hand, to shorten the insertion period while keeping the transmission efficiency constant, the number of symbols per pilot signal must be reduced, and this will increase the estimation error of the transfer functions.

Thus, the conventional interpolation coherent detection has a shortage in that the transmission efficiency must be reduced to cope with the fast changes in the transfer functions of the propagation paths.

DISCLOSURE OF THE INVENTION

Therefore, an object of the present invention is to provide a coherent detector and a coherent detection method for a digital communication receiver, which can improve characteristics of absolute coherent detection by estimating the transfer function of the propagation path at high accuracy without increasing the number of symbols per pilot signals.

In a first aspect of the present invention, there is provided a coherent detector for a digital communication receiver, which performs coherent detection of a received signal including pilot signals of a known pattern and information signals, by estimating for individual information symbols of the information signals transfer functions of a propagation path of the received signal on the basis of the pilot signals, by correcting the information symbols with estimated transfer functions, and by deciding corrected information symbols, each of the pilot signals alternating with each one of the information signals at a fixed period, the coherent detector comprising:

a received signal memory for storing the received signal;

pilot signal generating means for generating the pilot signals of the known pattern;

transfer function estimation means for estimating the transfer functions using the pilot signals stored in the received signal memory and the pilot signals of the known pattern supplied from the pilot signal generating means;

interpolation means for interpolating a plurality of transfer functions estimated by the transfer function estimation means, thereby obtaining the transfer functions for the information symbols;

compensation means for compensating information symbols stored in the received memory by using the transfer functions obtained by the interpolation means;

decision means for deciding the information symbols compensated by the compensation means; and pseudo-pilot signal storing means for storing a predetermined number of information symbols which are outputted from the decision means and adjacent to the pilot signals as pseudo-pilot signals, wherein the transfer function estimation means reestimates for individual information symbols corresponding to the pseudo-pilot symbols the transfer functions of the propagation path by using the pseudo-pilot signals and the information symbols in the received signal memory which correspond to the pseudo-pilot signals.

The transfer function estimation means may further comprise:

means for estimating a fading frequency from the pilot signals; and means for prestoring relationships between forgetting factors and estimation errors of the transfer functions with the fading frequency as a parameter, wherein one of the forgetting factors which will minimize the estimation errors is selected.

In a second aspect of the present invention, there is provided a coherent detection method for a digital communication receiver, which performs coherent detection of a received signal including pilot signals of a known pattern and information signals, by estimating for individual information symbols of the information signals transfer functions of a propagation path of the received signal on the basis of the pilot signals, by correcting the information symbols with estimated transfer functions, and by deciding corrected information symbols, each of the pilot signals alternating with each one of the information signals at a fixed period, the coherent detection method comprising the steps of:

storing the received signal;

generating the pilot signals of the known pattern;

estimating the transfer functions using the pilot signals stored and the pilot signals of the known pattern;

interpolating a plurality of transfer functions estimated, thereby obtaining the transfer functions for the information symbols;

compensating information symbols by using the transfer functions obtained in the step of interpolating;

deciding the information symbols compensated;

storing a predetermined number of information symbols which are decided in the step of deciding and adjacent to the pilot signals as pseudo-pilot signals; and reestimating for individual information symbols corresponding to the pseudo-pilot symbols the transfer functions of the propagation path by using the pseudo-pilot signals and the information symbols in the received signal which correspond to the pseudo-pilot signals.

The coherent detection means for a digital communication receiver may further comprise the steps of:

estimating a fading frequency from the pilot signals;

prestoring relationships between forgetting factors and estimation errors of the transfer functions with the fading frequency as a parameter; and selecting one of the forgetting factors which will minimize the estimation errors.

In a third aspect of the present invention, there is provided a digital communication receiver including a coherent detector which performs coherent detection of a received signal including pilot signals of a known pattern and information signals, by estimating for individual information symbols of the information signals transfer functions of a propagation path of the received signal on the basis of the pilot signals, by correcting the information symbols with estimated transfer functions, and by deciding corrected information symbols, each of the pilot signals alternating with each one of the information signals at a fixed period, the coherent detector comprising:

a received signal memory for storing the received signal;

pilot signal generating means for generating the pilot signals of the known pattern;

transfer function estimation means for estimating the transfer functions using the pilot signals stored in the received signal memory and the pilot signals of the known pattern supplied from the pilot signal generating means;

interpolation means for interpolating a plurality of transfer functions estimated by the transfer function estimation means, thereby obtaining the transfer functions for the information symbols;

compensation means for compensating information symbols stored in the received memory by using the transfer functions obtained by the interpolation means;

decision means for deciding the information symbols compensated by the compensation means; and pseudo-pilot signal storing means for storing a predetermined number of information symbols which are outputted from the decision means and adjacent to the pilot signals as pseudo-pilot signals, wherein the transfer function estimation means reestimates for individual information symbols corresponding to the pseudo-pilot symbols the transfer functions of the propagation path by using the pseudo-pilot signals and the information symbols in the received signal memory which correspond to the pseudo-pilot signals.

The transfer function estimation means may further comprise:

means for estimating a fading frequency from the pilot signals; and means for prestoring relationships between forgetting factors and estimation errors of the transfer functions with the fading frequency as a parameter, wherein one of the forgetting factors which will minimize the estimation errors is selected.

BEST MODE FOR CARRYING OUT THE INVENTION

The invention will now be described with reference to the accompanying drawings.

EMBODIMENT 1

Figure 3:
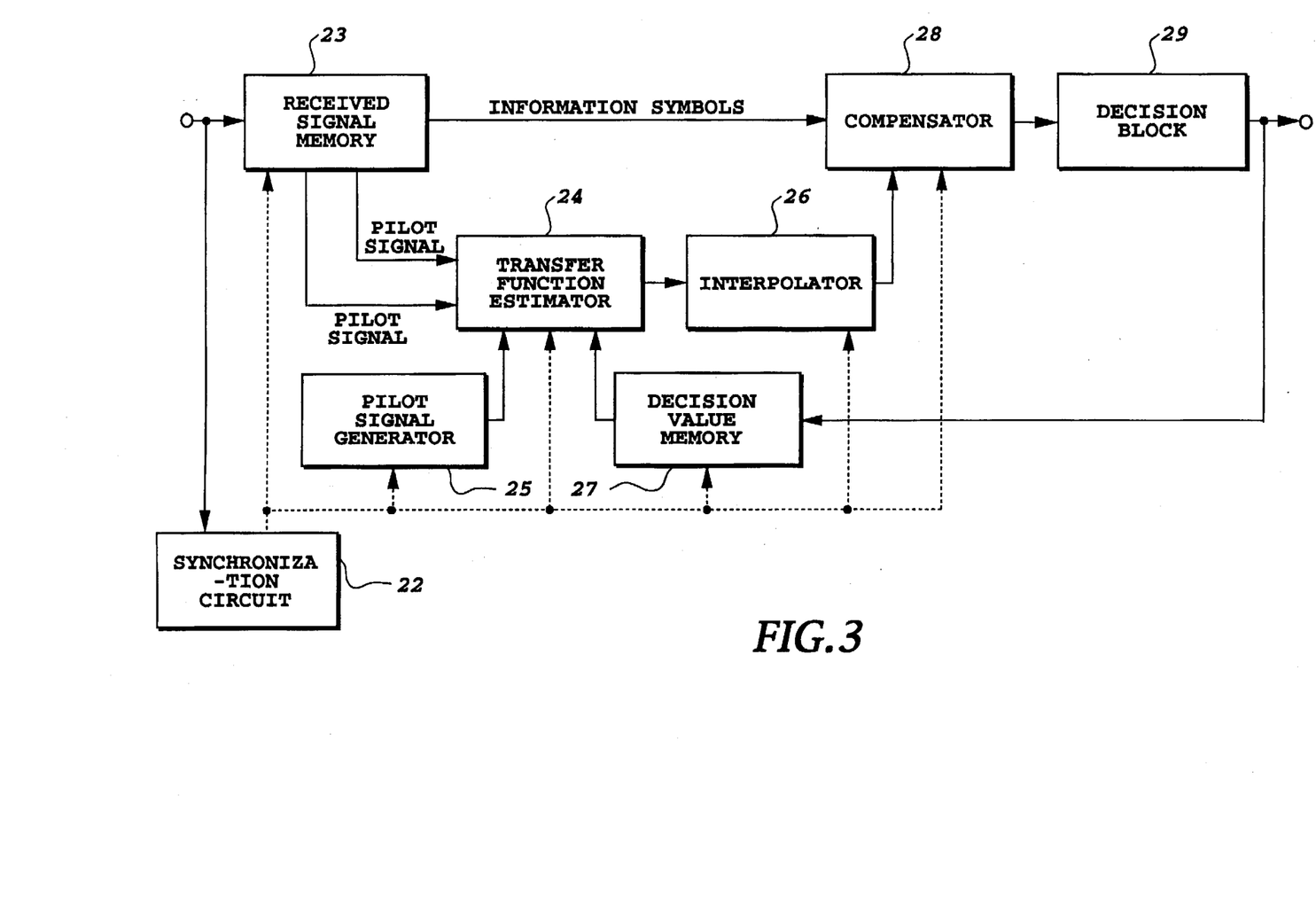
FIG. 3 is a block diagram showing a first embodiment of a coherent detector in accordance with the present invention.

FIG. 3 is a block diagram showing a first embodiment of a coherent detector in accordance with the present invention. The coherent detector corresponds to the combination of the interpolation compensator 9 and the decision block 10 of the conventional receiver shown in FIG. 2.

The received signal undergone the quasi-coherent detection by the quasi-coherent quadrature detector 5 in FIG. 2 is passed through the LPF 7 and the A/D converter 8, and is fed to a synchronization circuit 22 and a received signal memory 23 of the coherent detector of FIG. 3. The synchronization circuit 22 recovers clock timings of individual symbols, and frame timings indicative of a repetitive interval of the pilot signals, thereby generating a symbol synchronizing signal and a frame synchronizing signal. The symbol synchronizing signal and the frame synchronizing signal are fed to various blocks of the coherent detector as indicated by broken lines in FIG. 3.

The received signal memory 23 has a memory capacity equal to or greater than the total number of symbols in two pilot signals and the information symbol set therebetween, and stores baseband digital data fed from the A/D converter 8. The received signal memory 23 reads out two successive pilot signals by using the frame synchronizing signal, and fed the pilot signals to a transfer function estimator 24.

The transfer function estimator 24 estimates the transfer function of a propagation path by carrying out operation between a reference pilot signal of a known pattern which is fed from a pilot signal generator 25 and the pilot signals contained in the received signal. The transfer function of the propagation path can be estimated on the real time basis by iterating the operation each time the pilot symbol is received. One of features of the present invention exists in the estimation method of the transfer function, but its detail will be described later. The estimated transfer function is fed to an interpolator 26.

The interpolator 26 carries out a first-order or second-order interpolation using the estimated successive transfer functions, and estimates a transfer function at each information symbol timing between the pilot signals. Thus, the interpolator 26 generates one estimated transfer function per information symbol, and feeds it to a compensator 28.

Figure 4:
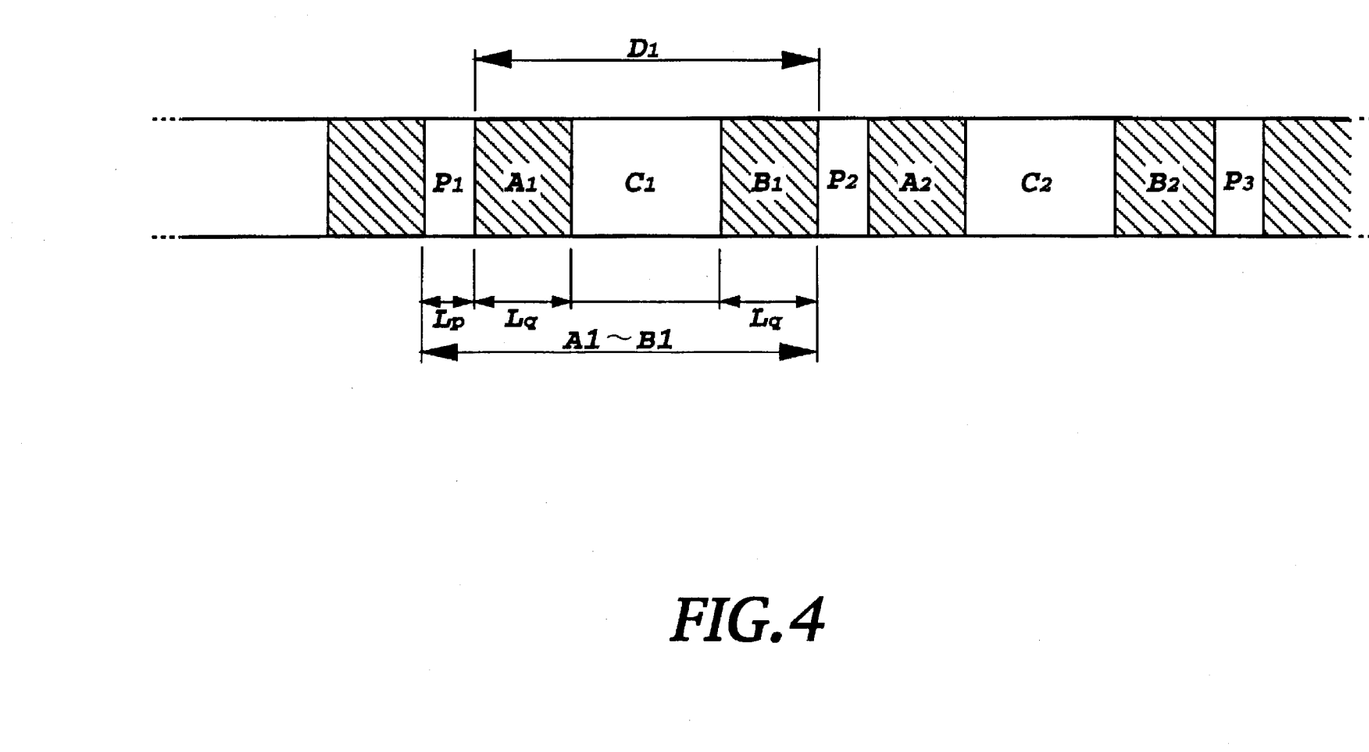
FIG. 4 is a diagram illustrating a format of a signal employed in the coherent detection of the present invention.

The compensator 28 compensates individual information symbols using the estimated transfer functions. The compensated information symbols are fed to a decision block 29. The decision block 29 performs absolute coherent detection of individual information symbols, and produces its results. Part of the decision results are stored in a decision value memory 27. For example, when a symbol set $D_1$ as shown in FIG. 4 is obtained as the decision results, the decision value memory 27 stores an information symbol set $A_1$ consisting of $L_q$ symbols adjacent to a pilot signal $P_1$, and an information symbol set $B_1$ consisting of $L_q$ symbols adjacent to a pilot signal $P_2$. With other information symbol sets $D_k$, the decision value memory 27 stores an information symbol set $A_k$ consisting of $L_q$ symbols adjacent to a pilot signal $P_k$, and an information symbol set $B_k$ consisting of $L_q$ symbols adjacent to a pilot signal $P_{k+1}$. These information symbol sets $A_k$ and $B_k$, each consisting of a predetermined number of symbols, are used to estimate (reestimate) the transfer functions.

More specifically, the transfer function estimator 24 estimates the transfer functions associated with the information symbol sets $A_k$ and $B_k$ under the assumption that the information symbol sets $A_k$ and $B_k$ (each including $L_q$ symbols) fed from the decision value memory 27 as new pilot signals with a known pattern (referred to as pseudo-pilot signals below). In other words, the transfer function estimator 24 estimates transfer functions associated with individual symbols in the information symbol sets $A_k$ and $B_k$, considering that the pseudo-pilot signals fed from the decision value memory 27 as true pilot signals. The estimation of the transfer functions is carried out in the following procedure in a manner similar to that of the true pilot signals $P_k$. First, assuming that individual symbols of the pseudo-pilot signal are designated by $u(n)$ ($n=1, 2, \ldots, L_q$), individual symbols of the received signal are represented by $r(n)$, and estimated values of the transfer functions associated with the individual symbols are denoted by $Z'(n)$, $Z'(n)$ is obtained by solving the following equation.

$$\Phi(n)Z'(n)=\Theta(n) \qquad (1)$$

where $\Phi(n)$ is an autocorrelation of each pseudo-pilot symbol constituting the pseudo-pilot signal, and $\Theta(n)$ is a cross-correlation between a pseudo-pilot symbol $u(n)$ and a received signal symbol $r(n)$. These are given by the following expressions.

$$\Phi(n)=\lambda\Phi(n-1)+u(n)u^*(n) \qquad (2)$$

$$\Theta(n)=\lambda\Phi(n-1)Z'(n-1)+u(n)r^*(n) \qquad (3)$$

where $\lambda$ is a forgetting factor which provides individual symbols with weighting factors varying exponentially. The forgetting factor is a coefficient that improves tracking ability by reducing the effect of the past. For example, weighting factors are gradually reduced as they go back to the past in such a fashion that the first preceding symbol is multiplied by $\lambda$ ($\leq 1.0$), and the second preceding symbol is multiplied by $\lambda^2$. From equations (1)–(3), the estimated values $Z'(n)$ of the transfer functions are given by the following equation.

$$Z'(n)=\{\lambda\Phi(n-1)Z'(n-1)+u(n)r^*(n)\}/\{\lambda\Phi(n-1)+u(n)r^*(n)\} \qquad (4)$$

Calculating equation (4) sequentially for individual symbols of the information symbol sets $A_k$ and $B_k$, the estimated transfer functions associated with respective symbols can be obtained. Although a method for estimating the transfer functions associated with the pseudo-pilot symbols is explained here, the transfer functions associated with the pilot signals are estimated in a similar manner. The estimation method itself is known, and is disclosed in Simon Haykin, "Adaptive Filter Theory", Prentice Hall, pp. 381–385, or the foregoing Sampei, et al. paper.

The present invention is characterized in that a predetermined number of information symbols adjacent to the pilot signals are used as pseudo-pilot signals, and the transfer function is estimated for each of those information symbols.

The estimated transfer functions are fed to the interpolator 26. The interpolator 26 obtains transfer functions associated with individual symbols in the information symbol set $D_1$ by the following equation using Gaussian interpolation.

$$Z'_{k+m/L_d}=\{1-(m/L_d)\}Z'_k+(m/L_d)Z'_{k+1} \qquad (5)$$

where $Z'_k$ and $Z'_{k+1}$ are estimated values of the transfer functions obtained from the k-th and k+1-th pilot signals and pseudo-pilot signals, respectively, and $Z'_{k+m/L_d}$ is an estimated value of the transfer function associated with the m-th information symbol in the $L_d$ information symbols between the pilot signals.

Since the present invention thus compensates the variations of the transfer functions, it can achieve the absolute phase detection.

Furthermore, since the present invention handles the signal after the quasi-coherent detection as a digital signal, blocks of FIG. 3 can be implemented by a digital circuit, or a microprocessor such as a digital signal processor. Moreover, signal delays by the processing can be minimized by fast performing the estimation and interpolation of the transfer functions, and compensation and decision of the symbols.

Figure 5:
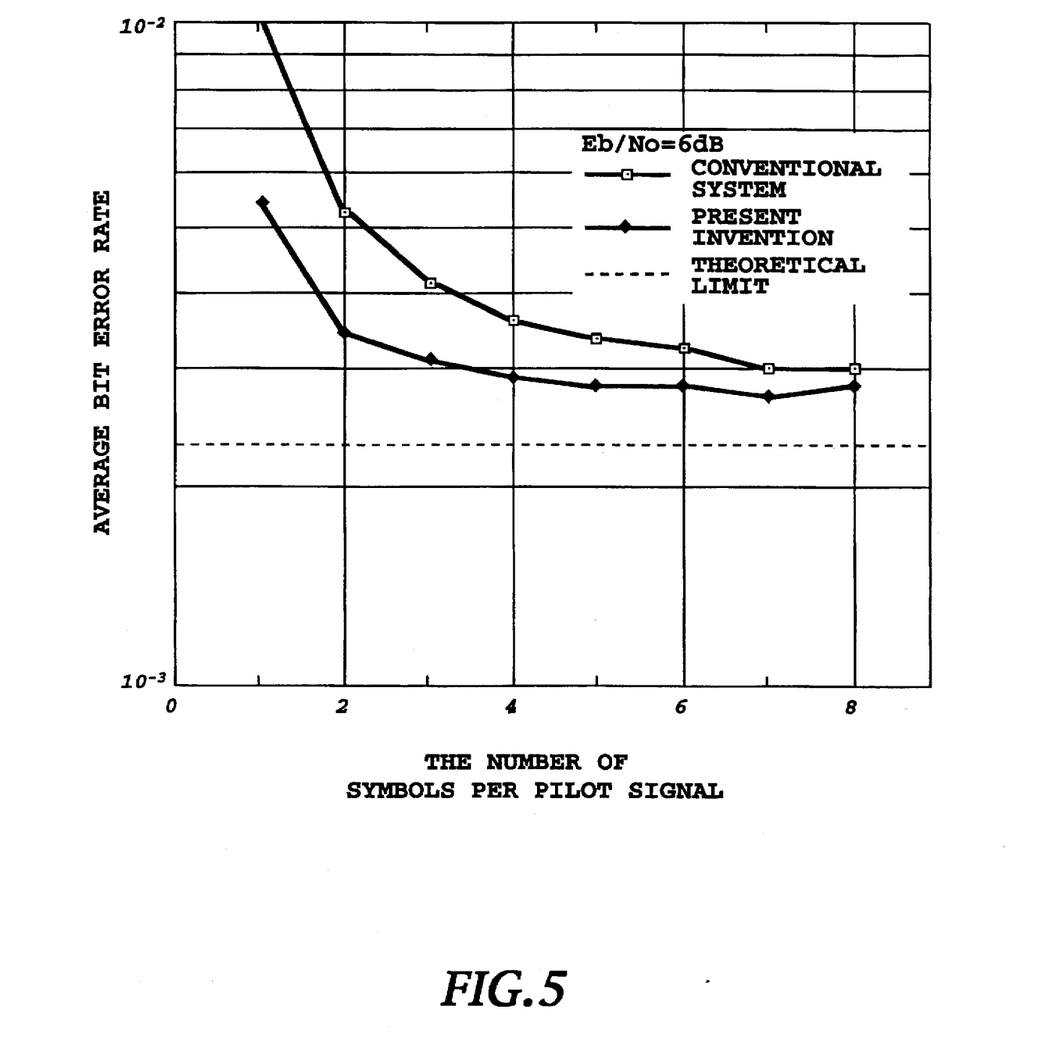
FIG. 5 is a graph illustrating average bit error rates of the present invention in comparison with those of a conventional example.

FIG. 5 is a graph illustrating average bit error rates when the coherent detector in accordance with the present invention is employed, in comparison with those when a conventional apparatus is used. The abscissas represent the number of symbols per pilot signal, and the ordinates indicate the average bit error rates. In this case, it is assumed that Eb/No (Energy per bit to Noise spectral density) is 6 dB, and that there are no fluctuations in the propagation path. Accordingly, the insertion period of the pilot signals has no effect on the bit error rate.

In FIG. 5, the broken line indicates a theoretical limit, open squares represent results of a conventional interpolation coherent detection using only the pilot signals, and solid squares represent results of the interpolation coherent detection in accordance with the present invention using part of the information symbols as the pseudo-pilot signals. The number of the information symbols used as the pseudo-pilot signal is $L_q=10$.

As is seen from the graph, using the pseudo-pilot signals makes it possible to reduce the number of symbols per pilot signal to less than half of that of the conventional apparatus. If the transmission efficiency is kept constant, the pilot signals can be inserted at every ½ interval when the number of symbols per pilot signal is ½. Accordingly, even if the transfer function of the propagation path varies at a double rate, the coherent detector can follow the variation. Thus, the present invention is particularly effective to deal with fast variations in the transfer functions of the propagation paths by inserting the pilot signals with a small number of symbols at a short period.

EMBODIMENT 2

Figure 6:
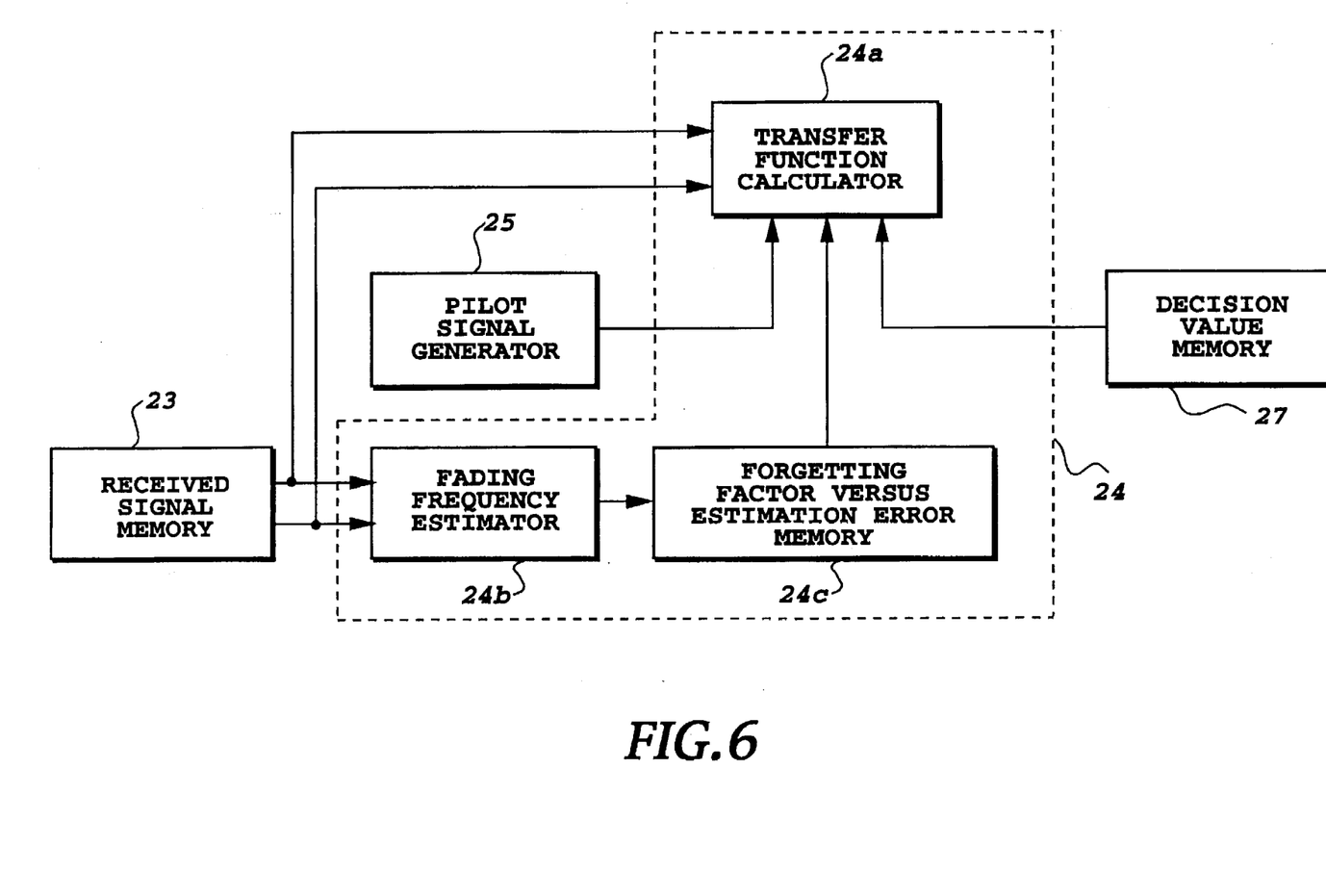
FIG. 6 is a block diagram showing a second embodiment of a coherent detector in accordance with the present invention.

FIG. 6 is a block diagram showing a major portion of a second embodiment of a coherent detector in accordance with the present invention. This embodiment is characterized in that it automatically changes the forgetting factor λ of the foregoing equations (2) and (3) in response to the fading frequency.

Figure 7:
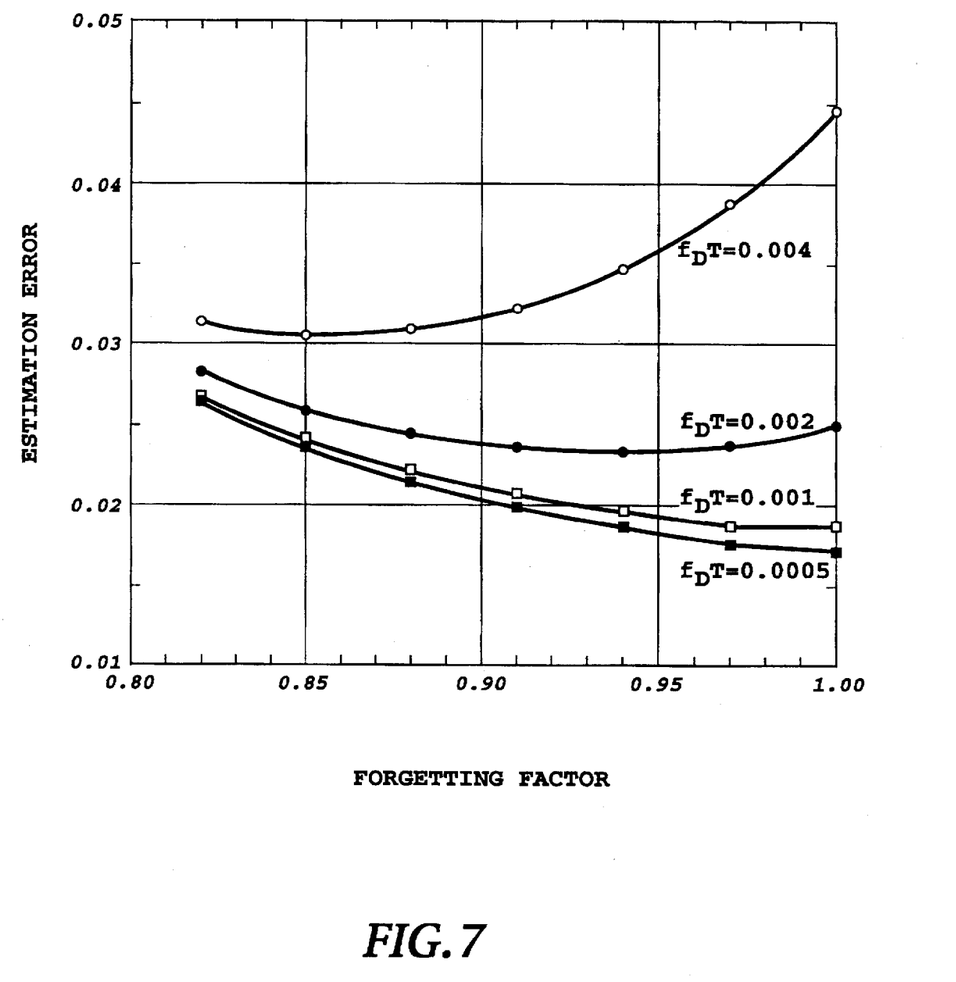
FIG. 7 is a graph showing variations in estimation errors due to forgetting factor.

FIG. 7 is a graph illustrating forgetting factor versus estimation error of the transfer function with $f_DT$ as a parameter. The $f_DT$ is a product of the maximum Doppler frequency $f_D$ (Hz) and one symbol length T (second), and corresponds to the fading frequency normalized by one symbol length. As is seen from FIG. 7, the forgetting factors minimizing the estimation error vary as $f_DT$ varies. For example, the forgetting factors must be set smaller as fading grow faster, that is, as $f_DT$ becomes larger. The following methods can be employed for setting the forgetting factors.

(1) A method of using a fixed forgetting factor.

It is an important issue at which value the forgetting factor should be fixed when a fixed value is used. One method is to set it at such a value that can respond to the maximum Doppler frequency $f_D$, and another is to set at such a value that corresponds to an average $f_DT$. As is seen from FIG. 7, a value about 0.85 is optimum in the former case, and a value about 0.91 is optimum in the latter case.

(2) A method of switching the forgetting factors in accordance with the fading frequency.

The second embodiment adopts this method, which will now be described with reference to FIG. 6.

The present embodiment differs from the first embodiment in the arrangement of the transfer function estimator 24: The transfer function estimator of the second embodiment differs in the following from that of the first embodiment shown in FIG. 3.

(1) A block having a function similar to that of the transfer function estimator 24 in FIG. 3 is denoted as a transfer function calculator 24a in FIG. 6.

(2) A fading frequency estimator 24b is provided.

The fading frequency estimator 24b estimates the phase difference between the pilot signals at both ends of an information signal, and estimates the fading frequency from the estimated phase difference.

(3) A forgetting factor versus estimation error memory 24c is provided for storing data corresponding to these in the graph of the forgetting factor versus estimation error as illustrated in FIG. 7.

The memory 24c is fed with a fading frequency estimated by the fading frequency estimator 24b, so that the forgetting factors that will minimize the estimation errors are obtained. The transfer function calculator 24a estimates the transfer functions by substituting the forgetting factors into equations (2)–(4).

The second embodiment make it possible to estimate the optimum transfer functions in response to the moving speed of a mobile station.

What is claimed is:

1. A coherent detector for a digital communication receiver, which performs coherent detection of a received signal including pilot signals of a known pattern and information signals, by estimating transfer functions of a propagation path of said received signal for individual information symbols of said information signals on the basis of said pilot signals, by correcting said information symbols with said estimated transfer functions, and by deciding corrected information symbols, each of said pilot signals alternating with each one of said information signals at a fixed period, said coherent detector comprising:

a received signal memory for storing said received signal;

pilot signal generating means for generating said pilot signals of said known pattern;

transfer function estimation means for estimating said transfer functions of the propagation path using said pilot signals stored in said received signal memory and said pilot signals of said known pattern supplied from said pilot signal generating means;

interpolation means for interpolating a plurality of said estimated transfer functions estimated by said transfer function estimation means, thereby obtaining said transfer functions of the propagation path of said information symbols;

compensation means for compensating said information symbols stored in said received memory by using said transfer functions obtained by said interpolation means;

decision means for deciding said information symbols compensated by said compensation means; and pseudo-pilot signal storing means for storing a predetermined number of said information symbols which are outputted from said decision means and adjacent to said pilot signals as pseudo-pilot signals, wherein said transfer function estimation means reestimates said transfer functions of the propagation path for the individual information symbols corresponding to the pseudo-pilot signals by using the pseudo-pilot signals and said information symbols in said received signal memory which correspond to the pseudo-pilot signals.

2. The coherent detector for a digital communication receiver as claimed in claim 1, wherein said transfer function estimation means further comprises:

means for estimating a fading frequency from said pilot signals; and means for prestoring relationships between forgetting factors and estimation errors of said estimated transfer functions with said fading frequency as a parameter, wherein one of said forgetting factors which will minimize said estimation errors is selected.

3. A coherent detection method for a digital communication receiver, which performs coherent detection of a received signal including pilot signals of a known pattern and information signals, by estimating transfer functions of a propagation path of said received signal for individual information symbols of said information signals on the basis of said pilot signals, by correcting said information symbols with said estimated transfer functions, and by deciding corrected information symbols, each of said pilot signals alternating with each one of said information signals at a fixed period, said coherent detection method comprising the steps of:

storing said received signal;

generating said pilot signals of said known pattern;

estimating said transfer functions of the propagation path using said pilot signals stored and said pilot signals of said known pattern;

interpolating a plurality of said estimated transfer functions estimated by said step of estimating, thereby obtaining said transfer functions of the propagation path of said information symbols;

compensating said information symbols by using said transfer functions obtained in said step of interpolating;

deciding said information symbols compensated;

storing a predetermined number of said information symbols which are decided in said step of deciding and adjacent to said pilot signals as pseudo-pilot signals; and reestimating said transfer functions of the propagation path for the individual information symbols corresponding to the pseudo-pilot signals by using the pseudo-pilot signals and said information symbols in said received signal which correspond to the pseudo-pilot signals.

4. The coherent detection method for a digital communication receiver as claimed in claim 3, further comprising the steps of:

estimating a fading frequency from said pilot signals;

prestoring relationships between forgetting factors and estimation errors of said estimated transfer functions with said fading frequency as a parameter; and selecting one of said forgetting factors which will minimize said estimation errors.

5. A digital communication receiver including a coherent detector which performs coherent detection of a received signal including pilot signals of a known pattern and information signals, by estimating transfer functions of a propagation path of said received signal for individual information symbols of said information signals on the basis of said pilot signals, by correcting said information symbols with said estimated transfer functions, and by deciding corrected information symbols, each of said pilot signals alternating with each one of said information signals at a fixed period, said coherent detector comprising:

a received signal memory for storing said received signal;

pilot signal generating means for generating said pilot signals of said known pattern;

transfer function estimation means for estimating said transfer functions of the propagation path using said pilot signals stored in said received signal memory and said pilot signals of said known pattern supplied from said pilot signal generating means;

interpolation means for interpolating a plurality of said estimated transfer functions estimated by said transfer function estimation means, thereby obtaining said transfer functions of the propagation path of said information symbols;

compensation means for compensating said information symbols stored in said received memory by using said transfer functions obtained by said interpolation means;

decision means for deciding said information symbols compensated by said compensation means; and pseudo-pilot signal storing means for storing a predetermined number of said information symbols which are outputted from said decision means and adjacent to said pilot signals as pseudo-pilot signals, wherein said transfer function estimation means reestimates said transfer functions of the propagation path for the individual information symbols corresponding to the pseudo-pilot signals by using the pseudo-pilot signals and said information symbols in said received signal memory which correspond to the pseudo-pilot signals.

6. The digital communication receiver as claimed in claim 5, wherein said transfer function estimation means further comprises:

means for estimating a fading frequency from said pilot signals; and means for prestoring relationships between forgetting factors and estimation errors of said estimated transfer functions with said fading frequency as a parameter, wherein one of said forgetting factors which will minimize said estimation errors is selected.

7. A digital communication receiver including a coherent detector which performs coherent detection of a received signal including pilot signals of a known pattern and information signals, by estimating transfer functions of a propagation path of said received signal for individual information symbols of said information signals on the basis of said pilot signals, by correcting said information symbols with said estimated transfer functions, and by deciding corrected information symbols, each of said pilot signals alternating with each one of said information signals at a fixed period, said coherent detector comprising:

a received signal memory for storing said received signal;

a pilot signal generator for generating said pilot signals of said known pattern;

a transfer function estimator for estimating said transfer functions of the propagation path using said pilot signals stored in said received signal memory and said pilot signals of said known pattern supplied from said pilot signal generator;

an interpolator for interpolating a plurality of said estimated transfer functions estimated by said transfer function estimation means, thereby obtaining said transfer functions of the propagation path of said information symbols;

a compensator for compensating said information symbols stored in said received memory by using said transfer functions obtained by said interpolator;

a decision block for deciding said information symbols compensated by said compensator; and a decision value memory for storing a predetermined number of said information symbols which are outputted from said decision block and adjacent to said pilot signals as pseudo-pilot signals, said pseudo-pilot signals being used to estimate said transfer functions of the propagation path for the individual information symbols corresponding to the pseudo-pilot signals.

* * * * *